United States Patent

[11] 3,625,501

[72] Inventors Richard D. Hein
179 Shady Lane Drive;
Jerry D. Stringfellow, 880 Cambridge Drive, both of Wabash, Ind. 46992
[21] Appl. No. 884,930
[22] Filed Dec. 15, 1969
[45] Patented Dec. 7, 1971

[54] REINFORCED RUBBER SHEAR PAD
16 Claims, 4 Drawing Figs.

[52] U.S. Cl. .................................................. 267/153,
213/20, 267/33, 267/63, 267/141, 267/152, 105/368 R
[51] Int. Cl. ..................................................... F16f 7/12, B61g 7/12
[50] Field of Search ........................................... 213/20, 40, 45; 105/368, 368 S, 368 R; 267/33, 57.1, 63, 135, 140, 141, 153, 152; 248/9

[56] References Cited
UNITED STATES PATENTS

| | | | |
|---|---|---|---|
| 1,832,184 | 11/1931 | Christen ........................ | 267/33 |
| 1,936,389 | 11/1933 | Hallquist ....................... | 267/33 |
| 2,021,570 | 11/1935 | Tangerman ................... | 213/21 |
| 2,044,649 | 6/1936 | Swennes et al. ............... | 267/33 |
| 2,980,417 | 4/1961 | Pence ............................ | 267/33 |
| 3,118,659 | 1/1964 | Paulsen ......................... | 267/33 |
| 3,203,361 | 8/1965 | Sharp ............................ | 105/368 R |
| 3,262,402 | 7/1966 | Mowatt-Lavssen et al. ... | 105/368 B |
| 3,417,712 | 12/1968 | Pulcrano et al. ............... | 105/366 D |
| 3,477,674 | 11/1969 | Schaffer ........................ | 267/153 |

Primary Examiner—Drayton E. Hoffman
Attorneys—Frank C. Rote, jr. and Harry F. Pepper, Jr.

ABSTRACT: An elastomeric shear pad is used to support and center the coupler arm of a railroad car. The pad, which supports the weight of the coupler arm, comprises an elastomeric cylinder the ends of which are bonded to a pair of mounting plates. The cylinder has a cavity extending in from one end thereof toward the other. The mounting plate at the open end of the cylinder is annular and the annulus communicates with this cavity. A torus or ring is secured to the inner surface of this plate, extending into and bonded to the elastomer. This torus serves to increase the bond area between the annular plate and the elastomer so that the area more nearly equals the total area of the bond between the cylinder and the other plate. The outer surface of the elastomeric cylinder contains a plurality of spaced grooves in which stiffening rings are positioned. These rings, made of steel or other high tensile strength material, serve to increase the compression resistance of the pad without adversely affecting the low shear rate thereof.

PATENTED DEC 7 1971

INVENTORS
RICHARD D. HEIN
JERRY D. STRINGFELLOW
BY
James A. Lucas
ATTORNEY

INVENTORS
RICHARD D. HEIN
JERRY D. STRINGFELLOW
BY James A. Lucas
ATTORNEY 3,625,501

REINFORCED RUBBER SHEAR PAD

BACKGROUND OF THE INVENTION

This invention relates to the field of elastomeric devices that are subjected to the combined forces of compression and shear. This particular device is useful in supporting a horizontally swinging coupler arm of a railroad car and maintaining the arm in coupling position.

The coupler arm is normally mounted on the under carriage of the railroad car, extending out from the end thereof. The arm typically terminates in a hitch which engages a similar hitch on a second car to join the cars together. As the cars are being joined together, the two coupler arms must be aligned to permit automatic interengagement of the hitches. Misalignment of the arms will prevent the cars from being joined together and may cause the cars to collide, thereby resulting in damage to the cars and couplers. The coupler arms must be movable horizontally to permit the cars to traverse curves and bends in the track and must be capable of movement in the vertical direction to accommodate humps or dips in the tracks and roadbed.

Recently, a coupler system has been devised in which the coupler arm rests on a saddle bonded to a rubber support. Normally, the coupler arm is in a centered, coupling position. However, if a lateral force is applied to the coupler arm, it will move from its centered position and will cause the rubber support to be deformed in shear. When the force is removed, the restorative properties of the rubber will cause the coupler arm to return to its centered coupling position. Heretofore, the use of these rubber supports has led to various problems such as premature failure of the bonds between the rubber and metal or failure of the rubber itself.

BRIEF SUMMARY OF THE INVENTION

One object of the present invention is an improved elastomeric pad for supporting a coupler arm in a normal coupling position.

Another object is a shear pad capable of undergoing shear deflection to a much greater extent than has heretofore been possible.

A further object is a shear pad capable of long life under constant compression and repeated shear deflection.

These and other objects are accomplished by use of a shear pad comprising a cylindrical elastomeric body having generally parallel ends and containing a plurality of spaced-apart grooves extending therearound between these ends. A high tensile strength reinforcement ring is located in at least some of the grooves to increase the resistance of the elastomeric body to compressive deflection. A cavity extends in from one end toward the other and plates are attached to the two ends of the rubber body. The plate at the open end has an annulus therein cooperating with the cavity in the rubber body, and includes means to increase the bond area between the plate and the end of the elastomeric body.

The invention can be more completely described with reference to the drawings in which.

Figure 1:
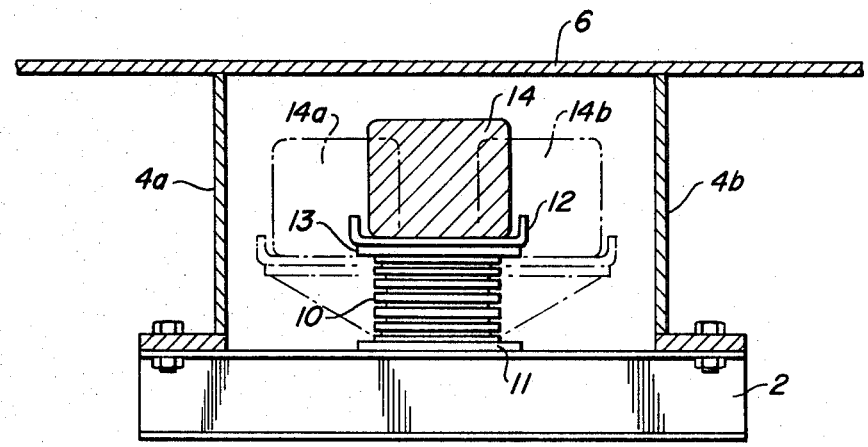
FIG. 1 is a general arrangement of a coupler arm mounted on a saddle connected to a shear pad.

FIG. 1 shows a simplified coupler housing for a railroad car, said housing including a base 2, a pair of vertical support members 4a and 4b and a top 6 forming the underframe of the car. An elastomeric shear pad 10 is bonded to a pair of plates 11, 13. The bottom plate 11 is secured to the base 2 of the coupler housing and the top plate 13 is bolted or otherwise fastened to a saddle 12 on which a coupler arm 14 rests. Although this feature is not shown, one end of the coupler arm 15 is pivotally attached beneath the railroad car and the other end is provided with a coupling hitch. Lateral movement of the coupler arm from the left side 14a to the right side 14b causes the pad 10 to become deformed in shear. When the lateral pressure is removed from the arm, it will return to its center position, ready for attaching engagement with a coupler arm of another railroad car.

Figure 2:
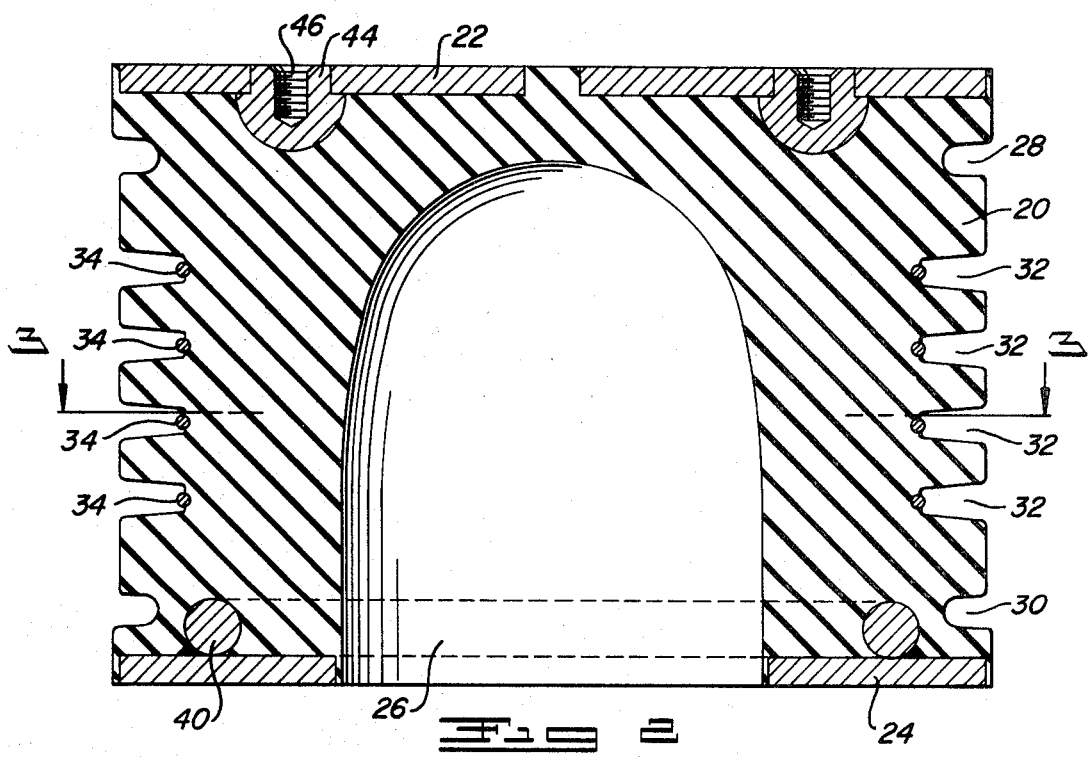
FIG. 2 is a cross-sectional elevation of a shear pad of the present invention.

FIG. 2 is a close up of the shear pad of the present invention. This pad comprises a cylindrical body 20, typically molded from rubber. A pair of plates, top plate 22 and base plate 24 are bonded to the two flat ends of the pad. An elongated generally circular void or cavity 26 is formed within the rubber and extends up from the bottom plate 24 toward the top plate 22. Depending upon the load and dimensional requirements of the shear pad and the type of rubber that is used in the cylindrical body, this void may have a diameter which is as much as two-thirds or three-quarters of the outer diameter of the body 20. Alternatively, the void may be quite small in comparison to the diameter of the cylinder.

Extending around the outer cylindrical surface of the body is a plurality of grooves 28, 30 and 32. Grooves 28, 30 is proximity to the two plates 22 and 24, are stress relief grooves that serve to prevent debonding and tearing of the elastomer at the surface of the plates. Four additional grooves 32 are spaced around the circumferential periphery of the shear pad between the two stress relief grooves. These grooves 32 are generally deeper than the grooves 28, 30 and are adapted to receive generally inextensible rings 34 which are used to increase the compression resistance of the shear pad. The grooves 32 are sufficiently deep to accommodate rings having an inner diameter that is sufficiently small that the rings will remain in the grooves even when the rubber body necks down (i.e., undergoes a decrease in diameter) during shear deformation.

As seen in FIG. 2, the entire surface of the top plate 22 is bonded to the top of the rubber body 20. However, the bottom surface of the rubber body is substantially smaller than the top surface because of the presence of the void or cavity 26. Accordingly, the available bond surface between the bottom plate 24 and the rubber body 20 is considerably smaller than that between the top plate 22 and the body. This increases the possibility that bond failure will occur at the interface of the bottom plate 24 and the rubber body 20 during severe deformation of the body. An important feature of the present invention is the use of a torus 40, welded or otherwise securely fastened to the bottom plate 24. This torus increases the total bonding area of the bottom plate 24, thereby permitting better distribution of stresses and much greater shear displacement of the shear pad without bond failure. The torus 40 also raises the shear plane above the interface between plate 24 and the body 20, thus further decreasing the likelihood of bond failure at the surface of the plate. A similar torus can likewise be welded to the top plate to increase its bonding surface if necessary.

Figure 3:
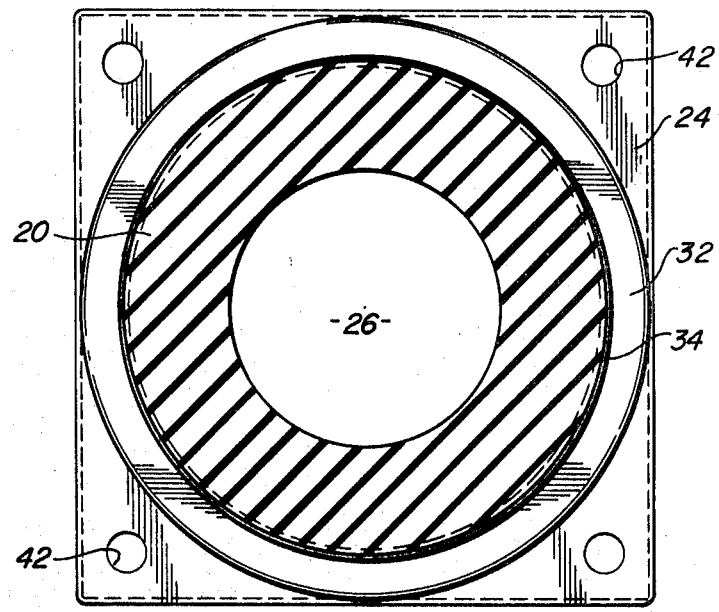
FIG. 3 is a view taken along lines 3—3 of a shear pad shown in FIG. 2.

As seen in FIG. 3, the bottom plate 24 is typically square and is provided with holes 42 at the four corners thereof. These holes provide for attachment of the shear pad to the base 2 of the coupler housing. Referring again to FIG. 2, a plurality of semicircular plugs 44 are press fitted into holes in the top plate 22. These plugs are tapped and are provided with threads 46 to receive bolts to secure the coupler arm saddle 12 to the shear pad. Thus, bolted to the coupler arm and the base of the housing, the shear pad supports the weight of the coupler arm in compression. Furthermore, when a lateral force is applied to the coupler arm to move it horizontally from side to side, the elastomeric pad is deformed in shear. The restorative tendency of the rubber in the pad exerts an opposing force on the coupler arm causing it to move back to the center position when the lateral force is removed.

In a typical installation, the shear pad is composed of a cylinder having a 55 durometer hardness and molded from a formulation containing natural rubber, the cylinder having an outer diameter of 8¼ inches and a height of 5 inches. The rubber cylinder is mold bonded to a pair of ¼-inch thick plates. Around the outer periphery of the cylinder are four grooves, threenquarter inches deep and spaced three-quarter inches apart from one another. Each groove is adapted to receive a 3/16-inch wire ring. A ⅜-inch stress relief groove is molded into the rubber about one-quarter inch from each of the plates. A dome-shaped cavity extends up from the bottom of the plate into the cylinder. The cavity is about 3¾ inches in diameter and about 4¾ inches deep. The bottom plate contains a 4-inch diameter annulus which communicates with the cavity. A ½-inch thick circular metal torus, having a mean diameter of 7 inches, is welded to the bottom plate and is embedded in the rubber body.

Figure 4:
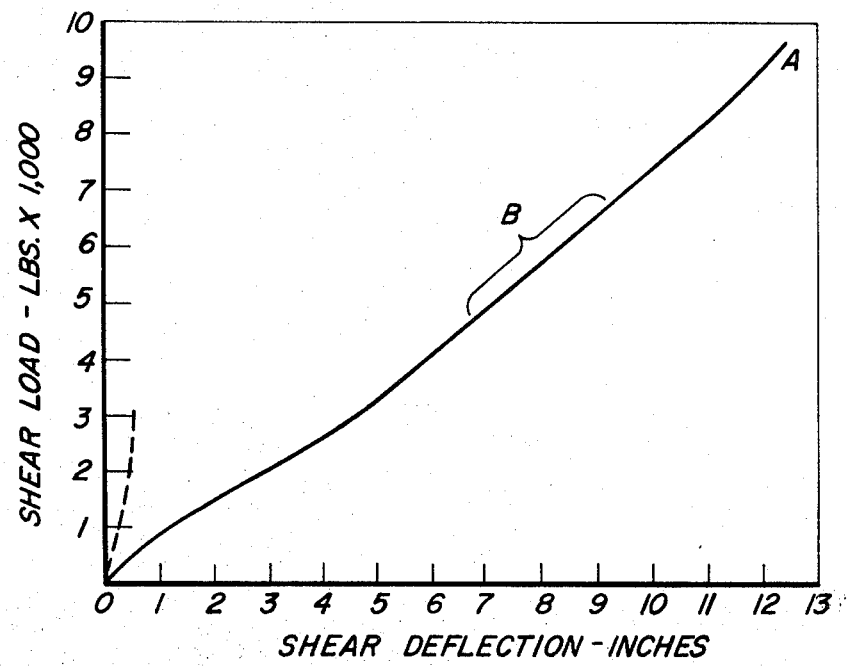
FIG. 4 represents a typical shear load deflection curve for a shear pad of the type shown in FIGS. 2 and 3.

The results of load deflection tests run on the above-described shear pad are shown in FIG. 4. In this test, a shear load is applied to the pad, and the deflection of the pad caused by the load is measured and recorded. A series of tests were run at 1,000-pound increments between 1,000 and 10,000 pounds, and the results were plotted to give the curve shown as a solid line in FIG. 4. At 10,000 pounds the shear pad deflected between 12 and 13 inches, point A on the graph, without failure. The shear spring rate was above 750 lbs./in. In similar tests run on shear pads without a torus welded to the bottom plate, bond failures often occurred at the interface between the bottom plate and the rubber body at about 6 to 8 inches of deflection (point B). It can thus be seen that the inclusion of a torus in the present novel shear pad to increase the area of the bonding surface between the plate and the rubber greatly increases the stress deflection capabilities of the pad.

The load deflection curve of the same pad in compression is shown by the dotted-line curve of FIG. 4. The steep slope shows that the pad is very stiff and is able to support the weight of the coupler arm without substantial deflection. The compression spring rate is about 5,000 to 6,000 lbs./in.

The size and the number of rings and grooves depends primarily upon the desired compression spring rate. In the above-described example, wherein the spring rate in shear was about 750 lbs./in., the use of four rings three-eighth inch in diameter gave a pad having a compression spring rate of about 5,000 to 6,000 lbs./in.$^2$. If laminations instead of rings were used, it would be difficult to obtain the desirable low shear rates that are possible when the shear pad is composed primarily of an uninterrupted column of rubber. For purposes of increasing the compression resistance of the shear pad, the rings are about 70 to 80 percent as efficient as plates. Thus, four rings would normally be used in place of three plates. Accordingly, it can be seen that the use of rings provides for finer adjustment of the compression rate than does the use of plates.

Another advantage of using rings and grooves instead of annular plates or discs is that the rings need not be bonded to the rubber whereas the plates do require bonding. This increase in the number of bonded surfaces increases the likelihood that bond failure might occur at one of these surfaces. On the other hand, welding a torus to either side of each of the plates to reduce the possibility of bond failure would result in a substantial decrease in the effective shear height of the rubber between the plates or conversely a substantial increase in the overall thickness of the shear pad in order to maintain a constant shear height.

The reinforcement rings are typically fabricated from a low carbon steel. However, other material such as nylon having the requisite tensile strength can be used. The rings are preferably round; however, they can have a cross section that is oval or any other shape consistent with the objectives to be obtained. These rings are preferably not bonded to the rubber in the grooves. The spacing between the rings as well as the dimension and the number of rings can be varied to meet specification requirements. Separate rings are preferred because of the ease with which they may be positioned in the grooves. If necessary, a coil spring can be used in place of separate rings. However, a coil spring would raise the effective shear spring rate of the pad, whereas a desired objective is to keep the shear rate as low as possible. Furthermore, it would be more difficult to accurately position a coil spring in the elastomer than it would be for individual rings.

When a compressive load is applied to a narrow column of rubber, there is a possibility that the rubber will buckle under load. To prevent buckling and to make optimum use of the rubber, a cavity is molded into the body. In this manner, the outer diameter of the cylinder must be increased to provided the same amount of rubber in cross section that would be present in a solid column. Because of the greater outer diameter, the cylinder will be more stable. At the same time, the thickness of the wall of the cylinder is reduced, and this serves to lower the shear rate of the pad, another desireable objective. Accordingly, it can be seen that the cavity size is dependent upon the combined goals of columnar stability and low shear rate.

As previously mentioned, the bond area between the rubber and the top plate is much greater than that between the rubber and the bottom plate. The use of a stress distribution ring or a torus obviates this difficulty by increasing the effective bonding surface between the lower plate and the rubber. The dimensions and shape of the torus are determined by such factors as the type of bond between the plate and rubber, the nature and type of rubber that is being used in the pad, the load conditions for which the shear pad is designed, etc. Generally, it is desirable to use a torus having an exposed surface area approximating the surface area of the hole in the plate, thereby effectively compensating for the loss in the bonding area resulting from the hole in the bottom plate and the cavity in the rubber. Instead of using a metal ring welded to the bottom plate, the plate could be fabricated with a raised circular ridge produced by stamping, cold rolling or the like to accomplish the same result. The plate and torus should be smooth where they are in contact with the rubber inasmuch as sharp angles and edges are likely to lead to bond failure. In the event that the cavity extends all of the way through the cylindrical pad, both plates may require a torus in order to obtain adequate bonds.

It should be understood that the principle involved in the use of a stress distribution ring or torus can be used in the other applications wherein a strong bond is required between a metal surface and an elastomer even through the bond contact area is small. In such a situation, a smooth toroidal projection on the contact surface of the metal embedded or extending into the elastomer will serve to increase the bonding area and the bond strength. The cross-sectional shape and dimensions of the torus are not critical except to the extent that the torus can be securely joined to the metal surface and the surface of the torus in contact with the elastomer is smooth and without any surface flaws that might lead to failure of the bond.

In the above example, the pad was prepared from a formulation containing natural rubber and other ingredients such as carbon black, various antidegradents, curing agents and accelerators blended together using mixing techniques which are well known to any competent rubber compounder. Instead of natural rubber other elastomers such as chloroprene and butyl rubber can be used, with recognition of the differences in the properties of various types of rubbers and allowance of the effect of these properties on the characteristics of the finished product. As previously mentioned, the rubber body is normally produced by molding and curing preferably in a compression mold. Typically, the top and bottom plates and the rings, are placed in a split cavity mold along with the rubber formulation and are bond molded to the rubber during vulcanization. Alternatively, the plates can be bonded to the rubber body after curing, utilizing a suitable adhesive. If the plates are thus post bonded, the bottom plate need not have a hole in it corresponding to the size of the cavity opening.

Although an elastomer having a durometer hardness of about 45–50 has been found to be suitable for use in molding the coupler shear pad of the present invention, higher durometer stocks can also be used. These harder stocks will have the effect of increasing the shear spring rate of the pad. This can be offset by suitable means such as decreasing the wall thickness of the pad.

Although the foregoing description has been limited to the use of this novel shear pad in connection with a railroad coupler arm, it is understood that the pad may be used for other purposes as well. Engine and transmission mounts are two such uses.

We claim:

1. A shear pad for interconnecting two spaced components for relative movement in substantially parallel planes, said pad comprising:
   A. a substantially cylindrical rubber body having
      1. a plurality of annular grooves generally parallel to the two ends of said body and axially spaced along the outer surface thereof, and
      2. an inner cavity commencing at a first end of said body and extending toward and terminating short of a second end,
   B. A substantially inextensible reinforcing ring disposed in each of a selected number of said grooves to increase the resistance of said body to compression, and
   C. a generally flat rigid plate bonded to the surface of each of the ends of said body wherein the plate bonded to the surface of said first end includes means to increase the interface bonding area between said plate and said surface.

2. The shear pad according to claim 1 wherein said means comprises a rigid torus affixed to said plate.

3. The shear pad according to claim 1 wherein said plate bonded to said first end of said body contains an opening aligned with said inner cavity, and wherein the bonding area added by said means is approximately equal to the area of said opening.

4. The shear pad according to claim 2 wherein said plate bonded to said first end of said body contains an opening aligned with said inner cavity, and wherein the bonding area added by said torus is approximately equal to the area of said opening.

5. The shear pad according to claim 1 wherein said substantially inextensible reinforcing rings are disposed in all of said grooves but the groove closest adjacent to each of the ends of said body.

6. The shear pad according to claim 2 wherein said substantially inextensible reinforcing rings are disposed in all of said grooves but the groove closest adjacent to each of the ends of said body.

7. The shear pad according to claim 3 wherein said substantially inextensible reinforcing rings are disposed in all of said grooves but the groove closest adjacent to each of the ends of said body.

8. The shear pad according to claim 4 wherein said substantially inextensible reinforcing rings are disposed in all of said grooves but the groove closest adjacent to each of the ends of said body.

9. The shear pad as defined in claim 1 wherein the outer diameter of said rubber body is less than the length thereof.

10. The shear pad as defined in claim 2 wherein the outer diameter of said rubber body is less than the length thereof.

11. The shear pad as defined in claim 3 wherein the outer diameter of said rubber body is less than the length thereof.

12. The shear pad as defined in claim 4 wherein the outer diameter of said rubber body is less than the length thereof.

13. The shear pad as defined in claim 5 wherein the outer diameter of said rubber body is less than the length thereof.

14. The shear pad as defined in claim 6 wherein the outer diameter of said rubber body is less than the length thereof.

15. The shear pad as defined in claim 7 wherein the outer diameter of said rubber body is less than the length thereof.

16. The shear pad as defined in claim 8 wherein the outer diameter of said rubber body is less than the length thereof.

* * * * *

PO-1050
(5/69)

UNITED STATES PATENT OFFICE
CERTIFICATE OF CORRECTION

Patent No. 3,625,501     Dated December 7, 1971

Inventor(s)   Richard D. Hein; Jerry D. Stringfellow

It is certified that error appears in the above-identified patent and that said Letters Patent are hereby corrected as shown below:

In the heading to the printed specification, between lines 7 and 8, the following should be inserted: [72] Assignee The General Tire & Rubber Company, a corporation of Ohio.

Column 1, line 75, the word "15" should read -- 14 --.
Column 3, line 2, the word "threenquarter" should read -- 3/4 --.

Signed and sealed this 6th day of June 1972.

(SEAL)
Attest:

EDWARD M. FLETCHER, JR.           ROBERT GOTTSCHALK
Attesting Officer                 Commissioner of Patents